Oct. 9, 1962   J. M. DUNN   3,058,021
OPTICAL COUPLING DEVICE BETWEEN X-RAY INTENSIFIER
AND VIDICON CAMERA TUBE OR THE LIKE
Filed Nov. 24, 1958   2 Sheets-Sheet 1
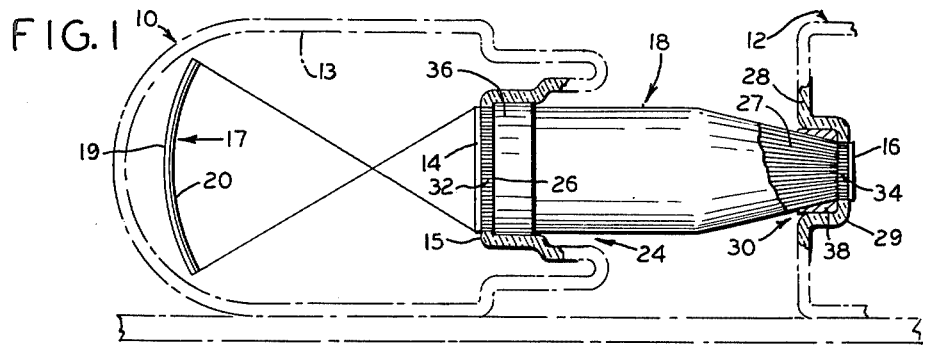
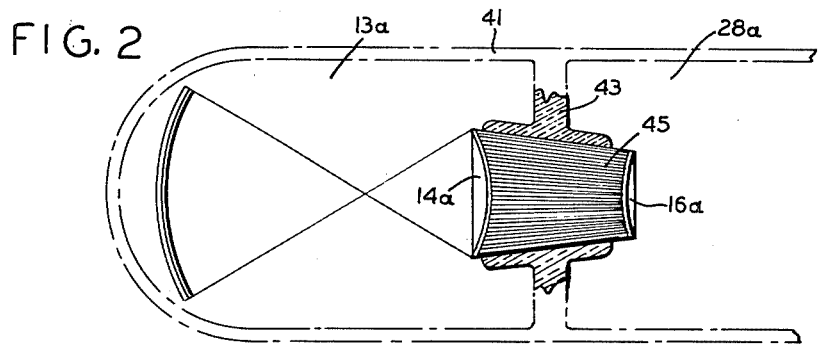
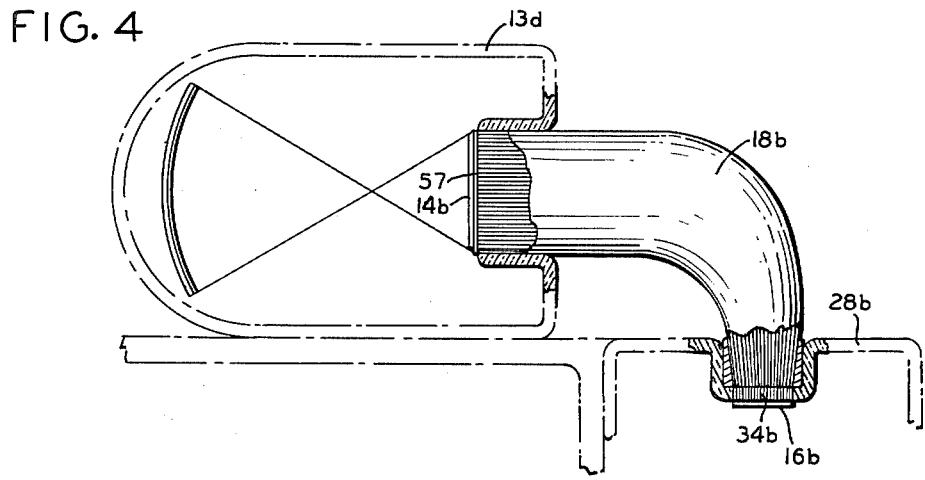
*INVENTOR.*
JOSEPH M. DUNN
*BY*
BLAIR, SPENCER & BUCKLES
ATTORNEYS.

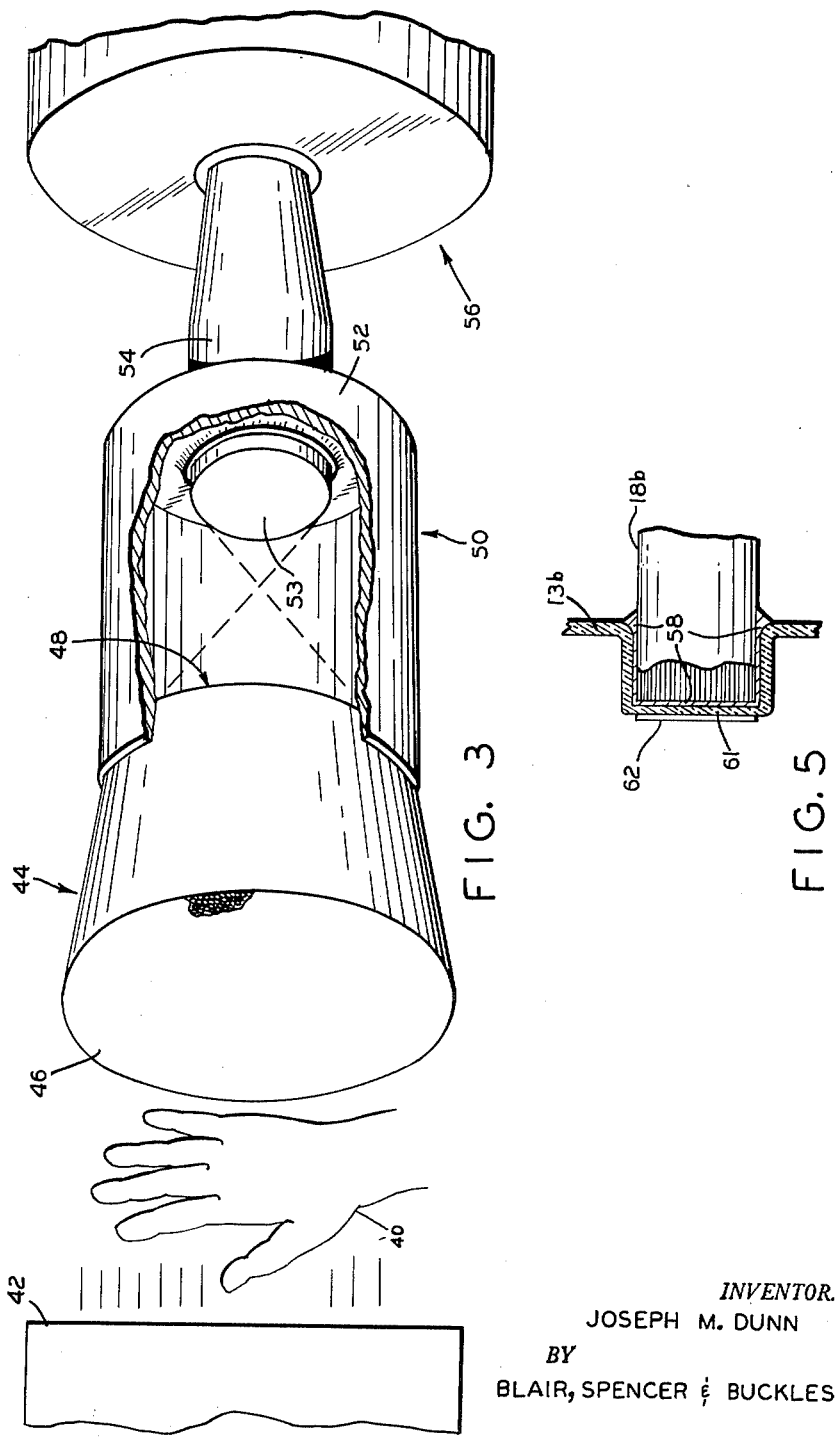

3,058,021
Patented Oct. 9, 1962

3,058,021
OPTICAL COUPLING DEVICE BETWEEN X-RAY INTENSIFIER AND VIDICON CAMERA TUBE OR THE LIKE
Joseph M. Dunn, Sturbridge, Mass., assignor to American Optical Company, Southbridge, Mass., a voluntary association of Massachusetts
Filed Nov. 24, 1958, Ser. No. 775,786
3 Claims. (Cl. 313—65)

This invention relates to an improved optical system for coupling the X-ray image formed on a fluorescent screen to a television camera or other image-utilizing apparatus. More particularly, it relates to a fiber bundle optical system construction adapted to transfer substantially the entire light output of such a screen a proper image size to the light-sensitive surface of a television camera or the like and to form thereon an image having high resolution and minimum vignetting. The invention has particular utility in combination with X-ray intensifier tubes being used with such cameras.

X-ray intensifiers for example of the type used in connection with the present invention are amplifying devices adapted to increase the intensity of conventional X-ray images. They are particularly useful in the fluoroscopic examination and photographing of medical patients since they enable stronger final images without increase in the amount of exposure given the patient and also significantly reduce the possibilities of X-ray absorption by the patient and examiner. However, since an examiner is continually subjected to X-ray radiation, it is desirable to reduce his dosage still further to prevent many of the deleterious consequences which have been found to result from excessive radiation. Therefore, it is preferable to remove the examiner completely from the site of the X-ray apparatus and associated image intensifier.

It has been proposed to accomplish such a separation and stronger image through the use of a television camera and associated equipment arranged to view the image formed by an intensifier and to reproduce such image on a cathode ray tube screen at a remote location. Prior to my invention, this was accomplished by utilizing a conventional lens system to couple the output of the intensifier to the light-sensitive surface of the television camera. However, in order to maximize the collection of light from the intensifier image, the lens system had to be a short focus high speed lens system of high quality disposed in close proximity to the intensifier screen and the camera screen. In addition to the high cost of such a lens system, other significant disadvantages are inherent therein. Of particular importance is the occurrence of vignetting, since with a lens of the coupling system in close proximity to the intensifier screen, the lens will subtend considerably larger angles from the central portion of the screen than from the outer portions thereof and thus the outer portions of the television image lack brilliance and contrast. Moreover, conventional commercial intensifiers form images of different sizes than the image-forming surfaces of readily available television cameras and the matching of such different sizes imposes an added element of cost on the system.

Accordingly, it is a principal object of my invention to provide an improved system for forming at a remote location an image developed by X-ray apparatus. It is another object of my invention to provide an improved system for coupling the image formed by a fluoroscope screen or by an X-ray intensifier to a viewing surface external of the intensifier. It is yet another object of my invention to provide a system of the above character capable of transferring an image from a fluoroscope screen or conventional intensifier to a conventional television camera or the like. It is a further object of my invention to provide a system of the above character in which the viewing surface may be disposed in a location subject to minimum X-ray dosage. A still further object of my invention is to provide a system of the above character capable of utilizing substantially all of the light generated by the X-ray screen or intensifier. It is yet another object of my invention to provide a system of the above character subject to minimum vignetting and capable of high image resolution. A still further object of my invention is to provide a system of the above character utilizing fiber optical image transfer means and capable of operation without use of an auxiliary lens system or the like. Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a schematic representation of an image intensifier and television camera optically coupled according to my invention;

FIGURE 2 is a schematic representation, somewhat like FIGURE 1, but showing a modified form of the invention;

FIGURE 3 is a schematic representation of an X-ray examination system similar to that of FIGURE 1 and incorporating a fiber bundle coupling unit between the image intensifier and the object under study;

FIGURE 4 is a schematic representation of a modified form of the invention; and

FIGURE 5 is a fragmentary sectional elevation of a modification of the embodiment shown in FIGURE 4.

In one preferred form, my invention incorporates a fiber optics construction in an image intensifier-television camera combination to transfer the image from the intensifier to the light sensitive surface of the camera. More particularly, the coupling unit comprises a bundle of slender filaments of glass or the like having one end connected to the image-forming fluorescent screen of the intensifier and the other to the light-sensitive surface of the camera. Each filament receives light from a small portion of the intensifier screen and transmits it by multiple internal reflections to a corresponding portion of said sensitive surface, and thus the combined effect of all the filaments is to transmit the entire image from the intensifier to the camera.

An intensifier-television camera combination assembled according to my invention may have as its terminal elements an image intensifier and a vidicon camera of conventional design requiring little or no modification except for one wall portion of each of the envelopes thereof, and dispensing with the previously required expensive special lens system. Moreover, substantially all the available light from the intensifier is utilized with complete absence of vignetting. A further advantage is derived from the fact that the fiber bundle coupling arrangement may be bent at right angles to remove the television camera from the path of X-rays from the X-ray source, thereby to prevent fogging of the picture which might result from such exposure. Also, as will be shown, the fiber bundle may be made larger at its input end than at the output end in order to match an intensifier image of one size to a light-sensitive surface of a smaller size and at the same time increase the optical speed of the system.

In another form of the invention, the fluorescent screen for receiving the X-ray image may be disposed directly upon the ends of the individual fibers of a bundle which is arranged to conduct the light generated thereby to the smaller opposite end of the bundle which is in close operative relation to a photo-emissive layer of material in an image-intensifier tube as will be more fully hereinafter described.

Turning now to FIGURE 1, an intensifier-television camera combination is shown which includes an intensifier tube generally indicated at 10 and a television camera tube generally indicated at 12. The intensifier tube, in known manner, forms an amplified image on a fluorescent screen 14 and the vidicon camera 12 has a light-sensitive layer of surface 16 to which this image must be transmitted. Such transmission is accomplished, according to my invention, by a novel coupling arrangement generally indicated at 18.

More particularly in FIGURE 1, the intensifier 10 comprises an evacuated glass envelope 13 in which is disposed a screen 17 having a first fluorescent layer or coating 19 thereon for receiving the X-ray image and a photocathode layer 20 adapted to emit, when excited, electrons which impinge on the screen 14 to cause it to fluoresce and form an electron-optical image thereon. During operation of the assembly, radiation from an external X-ray source (not shown) passes through an object (not shown) under study and strikes the fluorescent coating 19 and forms an X-ray image of the object. Light radiated from coating 19, in turn, passes into and excites cathode 20 to cause the emission of photoelectrons therefrom, such electrons being accelerated toward and focused as an electron-optical image at screen 14 by a suitable focusing and accelerating electrodes (not shown) thereby forming an intense, amplified reproduction of the first image on coating 19. For the sake of clarity, the thickness of screens 14 and 17 has been exaggerated.

As seen in FIGURE 1, screen 14 is formed on the inner surface 15 of envelope 13 at the base of a cavity 24. Fiber bundle 18 is disposed and preferably frictionally removably held in cavity 24 with its input end 26 bearing on the outer surface of envelope 13, and it is desirable to have the image formed on screen 14 transmitted, bit-by-bit, by the respective fibers of bundle 18 to layer 16.

Camera 12 likewise has an evacuated glass envelope 28 with the layer 16 disposed on its inner surface 29 at the base of a cavity 30. (In one type of camera, the layer 16 may actually be a photocathode emitting electrons to another surface (not shown) to be scanned by an electron beam. However, it makes no difference in the operation of the present invention whether surface 16 is a photocathode or other type of sensitive surface utilized in television cameras.) The output end 27 of bundle 18 is preferably removably and frictionally maintained against envelope 28 opposite surface 16. However, since any material spacing between layer 14 and bundle 18, due to the thickness of material required at the transparent window portion of the envelope 13, may allow the light to spread laterally and cause deterioration in the definition of the image being provided by bundle 18, there is provided in place of a transparent window at the base of the recessed cavity 24 an air-impervious face plate 32 composed of a very large number of very small optically insulated fibers bunched together, the individual fibers thereof serving to conduct unit portions of the electron-optical image formed by layer 14 to the opposite outer ends of the fibers. By such means, spreading of the light before entering bundle 18 and loss of image definition are avoided. A similar fiber optical face plate 34 is provided at the base of the recessed cavity 30 in place of a transparent window portion for the envelope 28. Thus the individual filaments of the bundle 18 in cooperation with the fiber optical face plates 32 and 34 may efficiently transmit light from all portions of screen 14 to corresponding portions of surface 16 and thus transfer to the latter the image originally formed on surface 19 of the intensifier 10 but at a materially reduced size and, accordingly, increased light intensity.

The fiber bundle 18 comprises a plurality of light-transmitting filaments. These individual fibers may have any one of the desirable cross-sectional configurations disclosed in U.S. Patent No. 2,825,260, and they may be clad in known manner as, for example, that described in said patent or in co-pending application Serial No. 703,914, filed December 19, 1957. The individual filaments may be contained at their ends by suitable means such as the collars 36 and 38 (FIGURE 1), and a suitable binding material may be used throughout their lengths if desired to maintain the fibers in fixed position after assembly of the fiber bundle. The fabrication of the bundle may, by way of example, be accomplished by the method described in the aforementioned co-pending application or co-pending application Serial No. 669,883, filed July 3, 1957, and which issued July 18, 1961, as U.S. Patent No. 2,992,516.

As shown in FIGURE 1, fiber bundle 18 is tapered toward its output end 27. The resulting reduction in diameter reduces the size of the image transmitted by the fiber bundle from the diameter of the fluorescent screen 14 to that of the sensitive surface 16. Such reduction is accomplished without loss of resolution since the individual fibers themselves are gradually tapered during the drawing thereof so that each one corresponds to a smaller area on surface 16 than on screen 14. At the same time, a very desirable increase in image light intensity is obtained without the usual optical aberrations of a high-speed lens system.

As illustrated in FIGURE 1, the ends of fiber bundle 18 may be maintained in position by force fits between the collars 36 and 38 and the walls of the cavities 24 and 30. For this purpose, the collars are preferably formed from a suitable plastic material which can easily be shaped to conform to the cavity dimensions. The collars should also be somewhat resilient or yieldable so as to maintain sufficient outwardly directed forces against adjacent portions of envelopes 13 and 28 interfitting therewith. Small quantities of mineral oil or the like may be employed between the ends 26 and 27 of bundle 18 and the corresponding portions of the envelopes in order to insure optical contact therebetween.

In FIGURE 2, a modified form of optical image transfer or coupling device is shown. In this modified construction, instead of using separate separable X-ray intensifier and vidicon camera envelopes 13 and 28 optically interconnected by the fiber optical bundle 18 as in FIGURE 1, the X-ray intensifier structure and the vidicon camera structure of FIGURE 2 are contained within a single larger envelope 41 and may have their respective vacuum chambers 13a and 28a completely isolated from each other by a central transversely extending impervious partition 43 which supports the impervious tapered fiber optical image transfer bundle 45 on the opposite ends of which are disposed fluorescent layer 14a and photo-emissive layer 16a.

It may be at times that the same degree of vacuum will be desirable or acceptable in both chambers and, when such is the case, neither partition 43 or the fiber bundle 45 need be of an impervious nature. However, in all cases, the fluorescent layer 14a and the photosensitive layer 16a will be applied directly upon the opposite ends of the fibers of the bundle 45, as shown. Before this is done, it is desirable to optically finish both ends of the bundle and any concave or convex curvature desired or even a flat face may be formed thereon. Nevertheless, in the modification of FIGURE 2, as in the earlier-described form, the optical image may be conveniently reduced and made to fit the different size of the screen or layer 16a. At the same time, there will be provided a corresponding increase in image light intensity.

Turning now to FIGURE 3, my invention may also include a second fiber bundle 44 disposed between the object under study and the X-ray intensifier so as to match the size of the object to the available image forming space on the photocathode of the intensifier. Thus an object to be studied, illustratively a human hand 40, is disposed between an X-ray source generally indicated at 42 and a fiber optical bundle generally indicated at 44. The input ends of the fibers of bundle 44 are coated with a layer 46 of fluorescent material, whereby an X-ray image of hand 40 is formed thereon and light from this fluorescent screen is transmitted through the bundle to a photoemissive layer 48 deposited upon the inner ends of the fibers to serve as the photo-cathode of an image intensifier generally indicated at 50. Hand 40 is larger than the cathode of intensifier 50 and, therefore, bundle 44, which is impervious to air, is tapered to match the relative sizes of screens 46 and 48 in the manner described above. The evacuated cylindrical envelope 52 of intensifier 50 would thus have the fiber optics bundle 44 serving as a relatively thick face plate therefor.

Still referring to FIGURE 3, the second fiber bundle, generally indicated at 54, would seal off the opposite end of the envelope 52 and serve to transmit the intensifier image formed on fluorescent coating 53, in intensifier 50, to the sensitive surface (not shown) of a television camera generally indicated at 56 in the manner described. It will be apparent that by utilizing this system, one may match an X-ray intensifier to any desired object size to reduce or enlarge, as the case may be, the image of the object projected by X-ray source 42. Prior systems have required expensive optical reimaging arrangements between the fluorescent surface and the input of the image intensifier (see, e.g., U.S. Patent No. 2,697,182). Further image-matching is accomplished between intensifier 50 and camera 56 by the fiber bundle 54.

In FIGURE 4 is shown another modified form of the invention. In this construction, the X-ray image intensifier envelope 13b is somewhat like the envelope 13 shown in FIGURE 1 except that envelope 13b has permanently secured in an end wall portion thereof a fiber optics bundle 18b and this bundle has a fluorescent layer 14b applied directly to the inner ends of the fibers thereof. In such an arrangement, the fiber bundle should be made impervious to air so that the vacuum within envelope 13b will be maintained.

In order to insure that the vacuum will be maintained, a thin transparent layer or membrane of glass or the like 57 may be used and arranged to extend entirely across the input end of all the fibers and cemented or fused thereto. In fact, it may even extend laterally sufficiently to overlie and completely close and seal the opening in the end wall of the envelope provided for the fiber bundle.

It might even be preferable on occasions to form this thin transparent layer or membrane for overlying the ends of the fibers of the bundle 18b while forming the envelope 13b and such a thin wall or membrane is shown at 61 in FIGURE 5. The fluorescent layer 62 will be subsequently applied to the exposed inner surface of this thin layer or membrane after which the envelope will be evacuated and sealed. However, in all cases, this layer or membrane 61 should be kept thin in order that the diffusion of light will be as little as possible. Of course, when the envelope and thin wall are formed simultaneously, the fiber bundle will have to be inserted later and at such time an optical cement as indicated at 58 might be used for securing the parts together. A cement which can be softened by a solvent to allow removal of the bundle from the envelope is preferred. Care should be exercised, nevertheless, to make sure that an optical contact between the fiber ends and this transparent layer 61 is obtained either by the cement 58 or even by a small amount of mineral oil or the like, as suggested previously relative to FIGURE 1. (In like manner, a sealing membrane could be used, if desired, between the fiber bundle face plate 32, or 34, in FIGURE 1 or between the face plate 34b in FIGURE 4 and the fluorescent or photosensitive layer of material employed adjacent thereto.)

As shown in FIGURE 4, the bundle 18b is curved and tapered so that its smaller output end and associated vidicon camera structure are disposed outwardly of the path of all stray X-ray radiation.

The output end of the bundle 18b may be similarly permanently secured in an end wall portion of envelope 28b, if desired, but as shown said output end is formed in a manner similar to that shown in FIGURE 1 so as to be frictionally held and readily detachable from envelope 28b. Of course, in such an arrangement, a fiber optical face plate 34b, as an integral impervious part of the envelope, will be required and the photocathode material 16b would be applied directly to the inner surface of the face plate. Also, the input end portion of the bundle 18b will also be made impervious. The tapered fiber bundle 18b may be relatively short and rigid, or, as taught in co-pending application Serial No. 703,914, it may be made considerably longer and flexible intermediate its opposite ends should the intended use thereof require. When flexible glass fibers are used, it is preferable to keep their diameters as small as ten thousandths of an inch or less.

Thus, by utilizing relatively inexpensive fiber bundles as image transfer or image-coupling devices, image intensifiers and television cameras of different sizes may be linked together in any desired combination thereof to reproduce, at remote locations, intensified images of objects under study or enlarged portions thereof. It will also be apparent that my system is not subject to optical aberrations including vignetting while maximizing utilization of the available light at the various light-generating surfaces is obtained.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the nature and scope of the invention which, as a matter of language, might be said to fall therebetween.

I claim:

1. X-ray image-intensifying apparatus comprising an evacuated envelope, a wall portion of said envelope being shaped so as to define a recessed cavity having a central base portion and surrounding side wall portions, at least a part of said central base portion being in the form of an air-impervious fiber optical image-conducting face plate, an X-ray image receiving screen within said evacuated envelope and disposed in opposed spaced aligned relation to said fiber optical face plate, a layer of fluorescent material upon said screen, a photoemissive cathode in closely adjacent relation thereto so as to be energized by light from said fluorescent material when said material is excited by an X-ray image impinging thereon, a second layer of fluorescent material upon the inner face of said face plate, a fiber optical image-conducting bundle composed of a very large number of relatively long thin optically insulated light-conducting filaments having their opposite ends disposed and secured in closely bunched side-by-side relation and like array relative to each other, said fiber optical bundle having its input end thereof positioned within said recessed cavity and in closely adjacent relation to said face plate, and means engaging said input end of said bundle and said side wall portions of said recess so as to releasably secure said fiber optical bundle in an operative position closely adjacent said face plate.

2. The combination as set forth in claim 1 including transparent immersion means between the input end of said fiber optical bundle and said face plate for producing optical contact therebetween.

3. The combination as set forth in claim 1 and wherein said fiber optical bundle is bent intermediate its ends and is of such length as to allow its output end to be disposed at a location out of the path of the radiation of said X-ray image and a layer of light-sensitive material upon the output end of said fiber bundle.

References Cited in the file of this patent
UNITED STATES PATENTS

| | | |
|---|---|---|
| 2,495,697 | Chilowsky | Jan. 31, 1950 |
| 2,761,084 | Sheldon | Aug. 28, 1956 |
| 2,825,260 | O'Brien | Mar. 4, 1958 |
| 2,877,368 | Sheldon | Mar. 10, 1959 |